(12) United States Patent
Nordmann

(10) Patent No.: US 6,614,468 B1
(45) Date of Patent: Sep. 2, 2003

(54) MONITORING INSTALLATION

(76) Inventor: Kurt Nordmann, Engimattstrasse 20, CH-8002, Zürich (CH)

( * ) Notice: Subject to any disclaimer, the term of this patent is extended or adjusted under 35 U.S.C. 154(b) by 0 days.

(21) Appl. No.: 09/507,375

(22) Filed: Feb. 18, 2000

(30) Foreign Application Priority Data

Feb. 24, 1999 (DE) ...................................... 299 03 350 U

(51) Int. Cl.[7] .................................................. H04N 7/18
(52) U.S. Cl. ........................ 348/143; 348/82; 348/373; 104/295; 396/56; 396/427
(58) Field of Search ................................. 348/143, 207, 348/82, 211, 373, 155, 213, 214; 104/295; 396/56, 427

(56) References Cited

U.S. PATENT DOCUMENTS

| 4,510,526 | A | * | 4/1985 | Coutta et al. ................ 348/143 |
| 5,023,434 | A | * | 6/1991 | Lanfer et al. ................ 235/375 |
| 5,225,863 | A | * | 7/1993 | Weir-Jones ................ 348/143 |
| 5,241,380 | A | * | 8/1993 | Benson et al. .............. 348/143 |
| 5,526,041 | A | * | 6/1996 | Glatt ........................... 348/143 |

\* cited by examiner

*Primary Examiner*—Chris Kelley
*Assistant Examiner*—Shawn S. An
(74) *Attorney, Agent, or Firm*—Ladas and Parry

(57) ABSTRACT

A monitoring installation in which a monitoring unit having a monitoring device is suspended from a trolley that rolls or glides along a rigid path by at least one traction rope or cable which pulls the trolley along the path.

13 Claims, 4 Drawing Sheets

MONITORING INSTALLATION

BACKGROUND OF THE INVENTION

The invention relates to a monitoring installation such as is typically used for monitoring rooms accessible to the public, such as shops and large stores containing goods for sale. As a rule these monitoring installations should fulfill two aims, to wit: supervise the shop and the goods exposed therein, which is usually done optically, and also act as a deterrent for would-be thieves. Both aims require the use of a comparatively large number of monitoring units per square meter of surface to be surveyed, where each monitoring unit contains the necessary cameras, video-recorders etc. However, both for keeping the expenses down and in order to simplify the monitoring process one endeavours to use as few monitoring units as possible, even in large rooms. For a good exploitation of the units one sometimes uses stationary units which either contain several cameras or are constructed in such a way that they can rotate around a vertical and a horizontal axis. But even then the range covered by a single monitoring unit remains rather restricted, and thus necessitates using numerous monitoring unit in order to survey a large surface.

BRIEF SUMMARY OF THE INVENTION

Hence it is a general object of the invention to fulfill both above-mentioned aims with the least possible number of monitoring units. To achieve this, the invention is defined as recited in claim 1. Accordingly, the invention allows one to monitor a very large surface even when the presence of high shelves makes it impossible to survey a large domain from far away or with the help of wide-angle and/or zoom-lenses. Further, the invention makes it possible to obtain with one or only a few monitoring units a deterrent effect that even exceeds that of a large number of usual stationary monitoring units. Indeed, the seemingly purposeful movement of a single unit above the head of a would-be thief, or along a path which he follows among the exposed goods, has a more disturbing effect than the quiet presence of stationary monitoring units with a view angle which the would-be thief can evaluate, or believes he can evaluate.

BRIEF DESCRIPTION OF THE DRAWINGS

The invention will now be illustrated through the description of embodiments and with the help of the appended drawings:

FIG. 2b shows a simplified section along line II—II of FIG. 2a,

DETAILED DESCRIPTION OF THE INVENTION

As a rule, a monitoring installation of the type considered here comprises a central command unit and at least a monitoring unit which is generally placed above head-hight in the room that must be surveyed; the monitoring unit may, for instance, contain a video-camera commanded by the central command unit, loud-speakers for issuing messages and possibly warnings, and also further auxiliary equipment. All these components are well-known to one skilled in the art, hence in what follows it will only be described how the monitoring unit of an installation according to the invention can be installed and moved in a room that must be surveyed.

Figure 1:
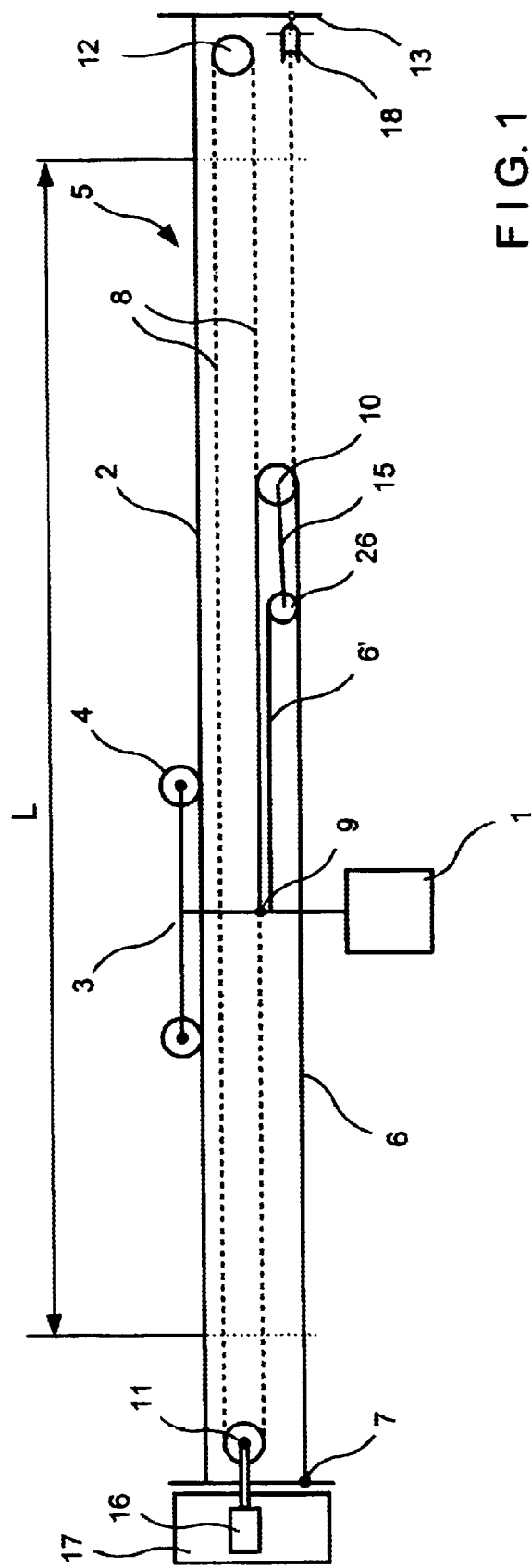
FIG. 1 shows a schematic view of an embodiment of the invention.

FIG. 1 schematically shows an embodiment of the invention. Reference number 1 identifies the housing of the monitoring unit, called satellite for short in what follows. The satellite 1 is supported by a hollow beam 5 that is slit lengthwise or consists of several parts; for clarity FIG. 1 shows only the upper surface (indicated by a heavy line) of the supporting beam. A trolley 3 supported by wheels 4 rolls on this upper surface 2 and carries the satellite 1 which hangs below the trolley.

The trolley 3 is moved through traction ropes (or cables) and for each function there is always provided a pair of traction ropes disposed symmetrically to the vertical symmetry plane of the beam in order to avoid a tilt and possibly a choking of the trolley 3 and also of a bogey 15 which will be described in detail below. FIG. 2b shows this symmetry whilst for simplicity FIG. 1 and its description only show, respectively mention, one of the two traction ropes that lie side by side. A traction rope 6, 8 is disposed within the hollow beam 5 and fixed at opposed ends of the beam. Although this traction rope can consist of a single piece, it will be described here for clarity as consisting of two sections, namely a passive section 6 and an active section 8. The passive section 6 extends from a first anchoring point 7 (on the left in the drawing) towards a purchase pulley 10 which is mounted in a bogey 15 freely running lengthwise within the beam and indicated in FIG. 1 by a thick line only, and then back to an attachment point 9 on the trolley 3. The active section 8 extends from this point to a first deflection sheave 11 at the left end of the beam, from there to a second deflection sheave 12 placed at the opposite end of the beam, then to the purchase pulley 10, and from there to a an idler 18 with a vertical axis (on the right hand side in the figure). From there a second part of the rope runs backwards, along a path (not shown) symmetric with respect to the vertical symmetry plane of the beam, until it reaches an anchoring point symmetric with the first anchoring point 7. A motor 16 commanded by a circuit 17, indicated only schematically, activates the first deflection sheave 11 which works as a driving roller. As can be seen in FIG. 1, this construction allows to move the trolley 3, and therefore the satellite 1, along a path of length L which is only slightly shorter than the beam 5.

The momentary position of the trolley 3 along the beam 5 is monitored by an optical device mounted on the trolley which reads in a manner known in the art a set of markings written on the beam. In order to transmit the signals generated by reading the marks and other signals issued by the satellite or intended for the same, and also in order to provide it with the necessary current, some electrical conductors are provided. These conductors extend from the trolley 3 to a place near the left anchoring point 7, following a path which is essentially parallel to the path of the passive section 6 of the traction rope. Accordingly, the figure only shows the part 6' of these conductors which extends from a purchase pulley mounted on the bogey 15 to the trolley 3.

Among others, these conductors allow it to command a camera installed in the satellite, to transmit the video-signals of the same to a stationary observation post, and also to rotate and to tilt the satellite as desired in a known way which shall not be further described here. The path of these conductors is described below with reference to figure 2a.

Figure 2A:
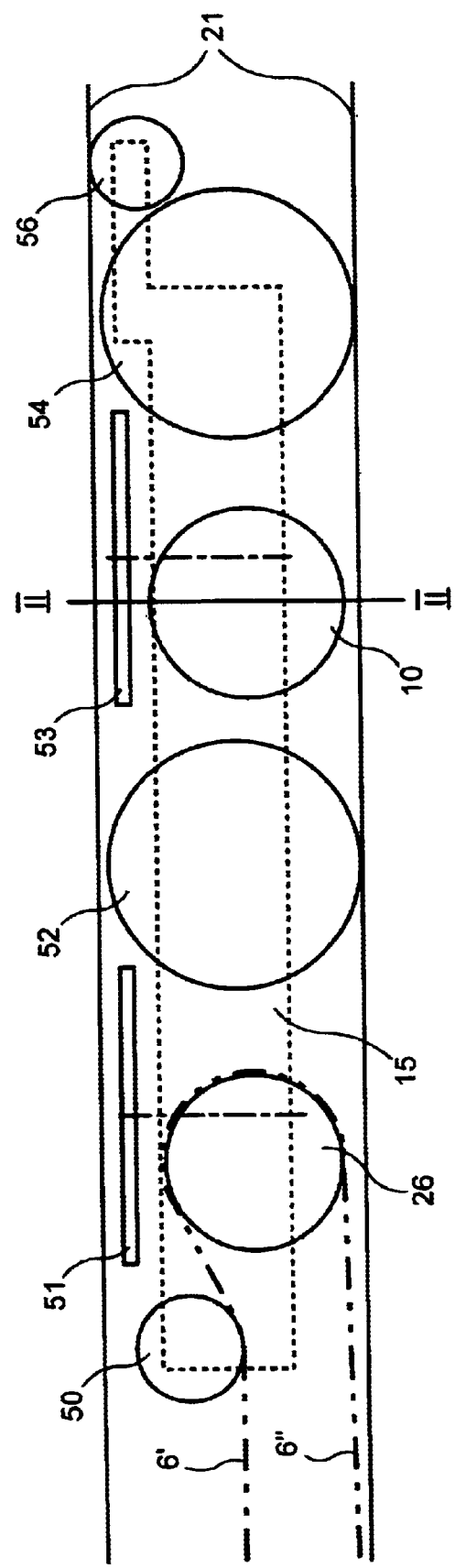
FIG. 2a shows a schematic side-view of the purchase unit of FIG. 1.
Figure 2B:
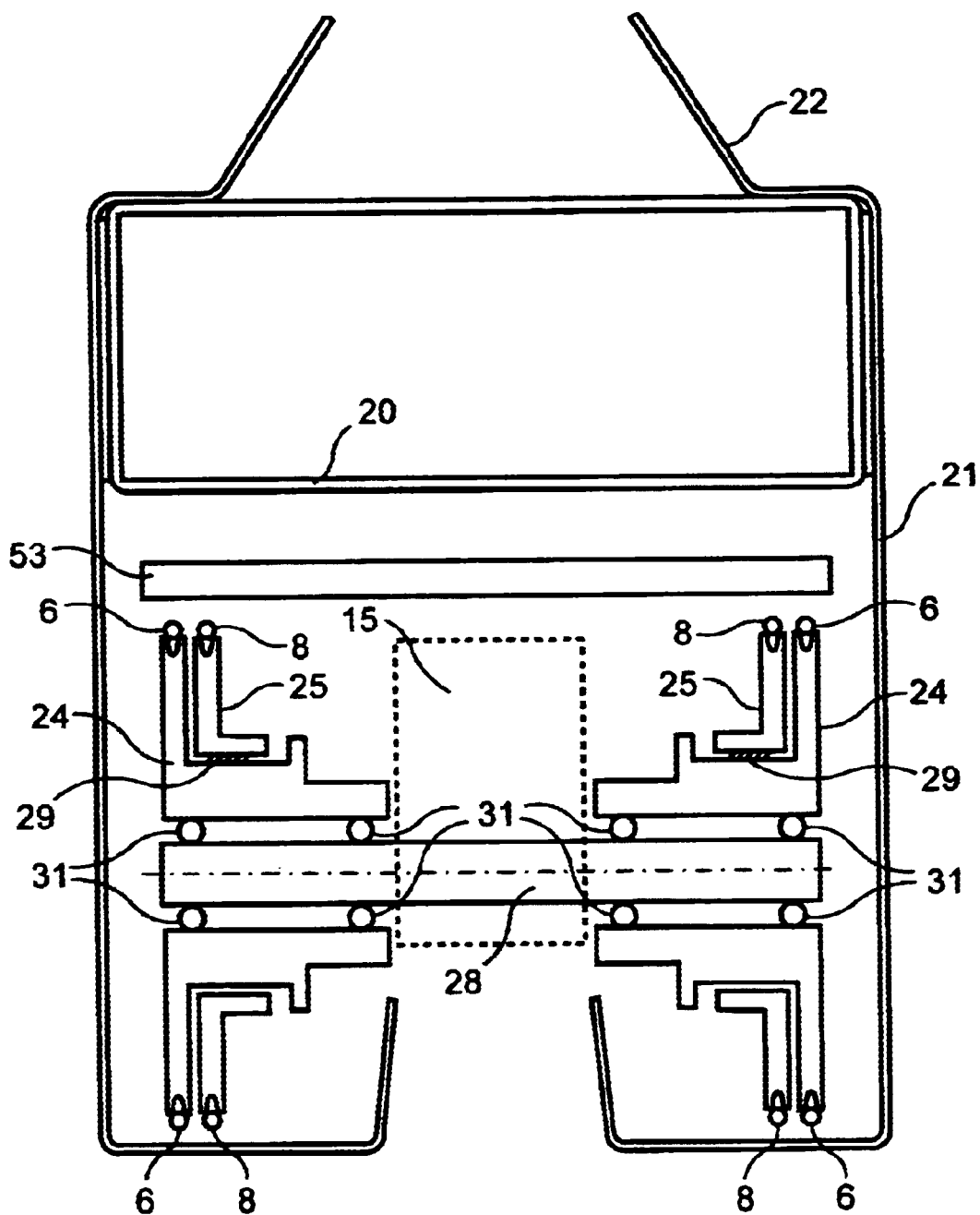

FIG. 2a is a schematic view of the bogey which carries the purchase pulley 10. The bogey essentially consists of a bogey frame 15 (indicated by dashed lines) that carries a number of supporting, deflecting and guiding wheels. The body rolls within the rectangular section of the beam 5, of which only the upper and lower surface are visible in FIG. 2a. Starting from the left, the bogey comprises the following wheels and pairs of wheels, where each pair consists of two wheels or sheaves which are symmetric with respect to the vertical symmetry-axis of the beam. A pair of guide wheels 50 for the conductor 6' which departs towards the trolley. A pair of return sheaves 26 for the electrical conductors 6', 6". A guide wheel 51 that freely rotates about a vertical axis and guides the bogey within the beam by rolling on the inside of its left or right lateral wall; a pair 52 of supporting wheels freely rotating about a horizontal axis, which roll on the bottom of the hollow beam; a pair 10 of purchase pulleys; a guide wheel 53 that works in the same way as the guide wheel 51, so that both together avoid a tilting and jamming of the bogey; a pair 54 of supporting wheels analogous to the pair 52; and a pair 56 of rolls which steady the bogey by contacting the upper wall of the beam from inside. In order to reduce the noise generated by the moving bogey, wheels 51 to 54 are preferably made of polyurethane.

FIG. 2b schematically shows a section along II—II of FIG. 2a. The beam comprises a stiff, hollow profile 20 with a rectangular cross section and a sustaining case 21 which may for instance be made from a bent metallic sheet. The beam can be made of several profiles joined lengthwise and can have an overall length exceeding 20 m. In order to suspend the beam for instance below the ceiling of a hall that must be monitored, a supporting device 22, which shall not be described in detail here, is provided at several places along the beam. Here again the frame 15 of the bogey is only hinted at by dashed lines. The pair 10 of purchase pulleys (cf. FIG. 2a) which are symmetric relative to the vertical symmetry plane of the beam comprises two outer return sheaves 24 for the passive section 6 of the traction rope and two inner return sheaves 25 for the active section of that rope. The outer sheaves 24 are mounted through roller bearings 31 on an axis 28 fixed on the frame 15. The inner sheaves 25 are journalled on the base of the outer sheaves through a friction bearing 29, so that they can rotate with a certain resistance relative to the latter. This allows a certain irregularity in the dynamical behavior of the rope sections 6 and 8, and damps the movements generated by such irregularities. FIG. 2b further shows a transverse section through the guide wheel 53; note that its vertical axis lies outside this section (cf. FIG. 2a) so it will not cross the axis of the return sheaves.

The two first sections of the passive part 6 of the traction rope which start from the left-hand anchoring point 7 (see FIG. 1) essentially rest on the bottom of the case 21 and then run in the grooves of the deflecting roller 24 which deviates them by 180°. From the upper part of these rollers the traction rope then runs to its attachment point 9 on the carriage 3. From there the active section 8 of both traction ropes runs to the left-hand deflection sheave 11 (FIG. 1). Thereafter the upper part of the active section of both traction ropes runs within the hollow profile 20 until it reaches the right-hand deflection sheave 12. This arrangement limits the sag of this part even when the beam is very long, and it further avoids an interference between this part and other ropes or cables or auxiliary elements. The traction ropes then run from the right-hand deflection sheave 12 back to the grooves of the deflection rollers 25, at the upper part of the same (FIG. 2b). After being deflected by 180° the lower parts of the passive sections leave the roller near the bottom of the case 21 and rest on this bottom on their way to the idler 18 on the right-hand side. The electrical supply conductors for the satellite may be special conductors with a round or flat section which essentially run parallely to the active section of the traction ropes. Between the anchor point 7 and the return sheaves 26 these conductors rest on the bottom of the case 21; at the end of this path there are guided in a groove of the return sheaves, lead around these sheaves and deviated by 180°. The guide wheels 50 reliably guide the conductors with respect to the return sheaves 26.

Figure 3:
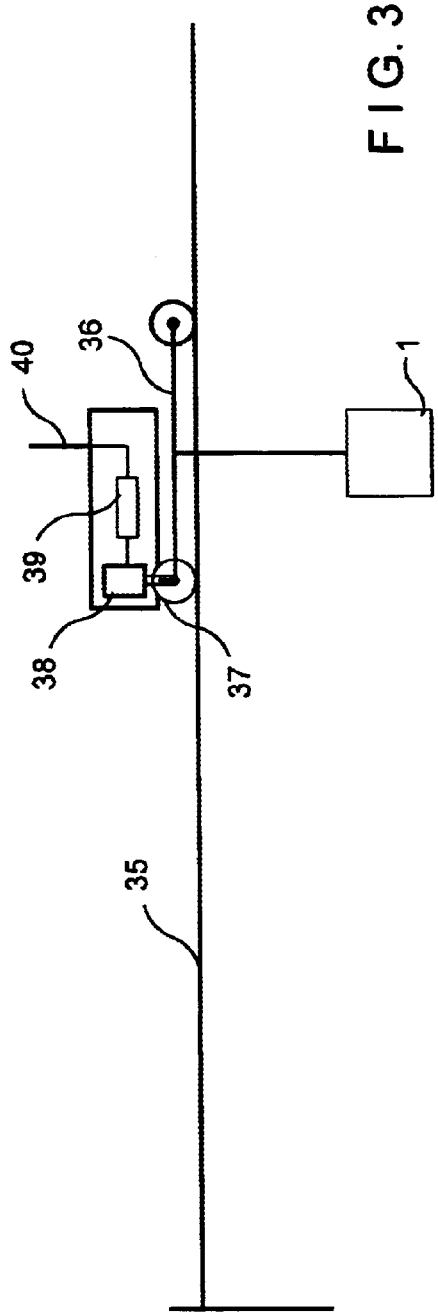
FIG. 3 is a sketch of a second embodiment of the invention which does not use traction ropes, and FIG. 4 schematically shows a suspension device for the installation shown either in FIG. 1 or in FIG. 3.

FIG. 3 schematically shows a further embodiment of the invention where the trolley that carries the monitoring unit is not moved by traction cables forth and back along an essentially straight path, but consists of a trolley on rails that moves independently on a web of railway lines which may comprise curves and points. This allows to chose the domain to be monitored more freely, although it requires a more complicated structure. It is in particular necessary either to provide the trolley with its own energy source, which may for instance be a reloadable battery, and/or to mount a conductor rail along the path of the trolley. It is also possible to provide different combinations of batteries and of conductor rails which extend along a limited part of the path of the trolley, where the conductor rails are used either for reloading the batteries and/or for the necessary electrical supply when the trolley remains stationary. Similar considerations are valid for the transmission of command signals to the trolley, it being possible to effectuate this transmission either through an additional conductor rail or in a cableless fashion (by radio, ultrasonics, infrared radiation etc.). FIG. 3 shows a sketch of a radiocontrolled embodiment. Reference number 1 again identifies the satellite with its monitoring unit, 35 identifies an usually horizontal web of railway lines which may comprise curves and points, and number 36 identifies a rail-supported trolley running on this web. At least one driving wheel 37 of this trolley is moved by an electromotor 38. Its electricity supply can be provided by a reloadable battery (not shown) located on the trolley or by conductor rails. Thus, the battery can for instance be reloaded at a refill station placed next to the rail and to which the trolley connects itself when necessary. A command circuit 39 on the trolley receives the necessary commands either in a wireless fashion (e.g. by radio through an antenna 40) or through connections which are provided at certain places of the railway lines for enabling a stationary mode. The command circuit commands all necessary functions in a way known to one skilled in the art and which will therefore not be further described here.

Figure 4:
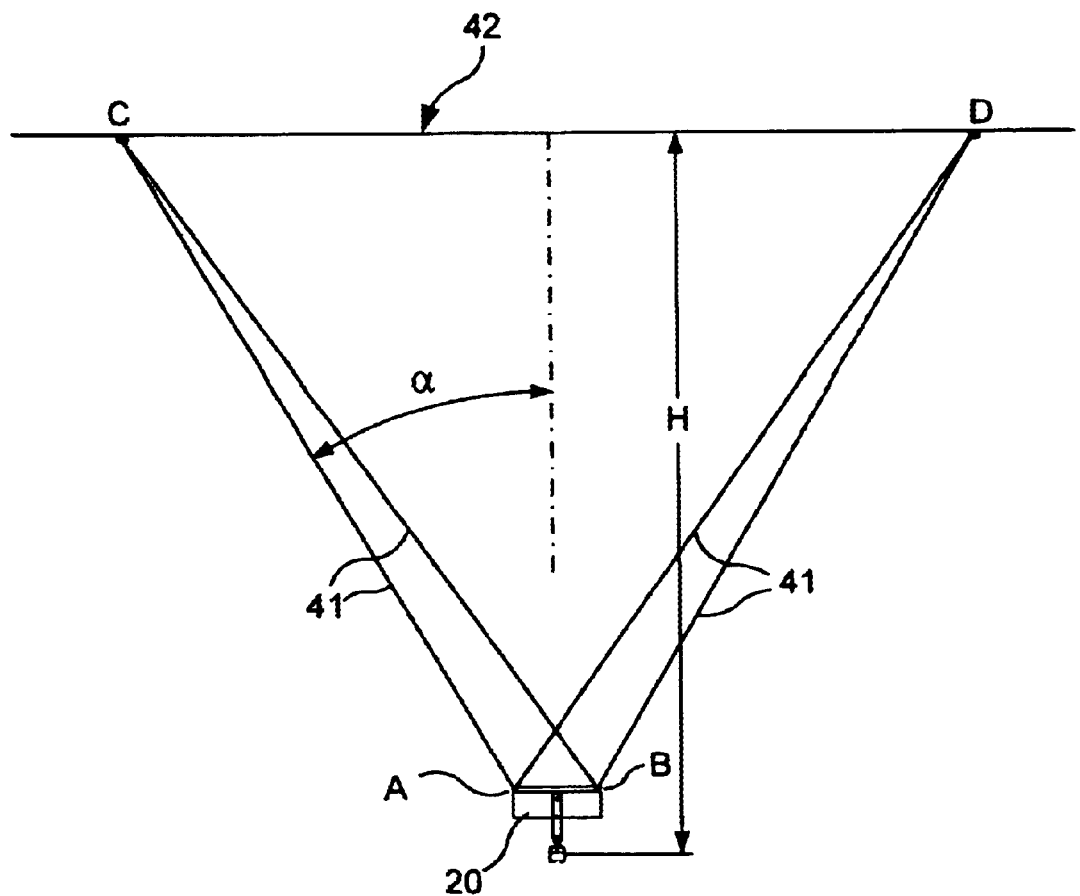

FIG. 4 shows a suspension of a rail track along which the monitoring unit can be moved which is appropriate for large halls. The figure shows a lengthwise view of one suspension device, it being understood that several such devices comprising supporting cables will be arranged along the track. Reference number 20 points at the hollow profile, shown in FIG. 2, which supports the track. A one-piece supporting cable 41 runs from an upper edge A of the hollow profile 20 to a point D at the ceiling of the hall, from there to the other upper edge B of the hollow profile, then back to A, then to a second point C at the ceiling 42 of the hall, and finally from there to B. The supporting cable is maintained by clamped joints (not shown) at points C and D and also where it passes the points A and B. This allows precise and simple adjustments ensuring that the track will be suspended as desired. This embodiment allows a free distance H between the monitoring unit and the ceiling that may be as large as 8 m; the angle α is preferably chosen between 30° and 45°.

What is claimed is:

1. A monitoring installation comprising a monitoring unit including monitoring means, said monitoring unit being movable along a track, a trolley supporting said monitoring unit and which rolls or glides along said track over a rigid path and at least one traction rope or cable, which pulls the trolley along the path, wherein said at least one traction rope or cable comprises two sections, a first extremity of the traction rope is fixed at a first end of the track and runs from there to a pulley of a purchase device movable along the track, then back to a first deflection sheave placed at the first end of the track, from there to a second deflection sheave placed at the second end of the track, then back to a further pulley of the purchase device, and finally to the second end of the track, the trolley being connected to a separation point between the sections, which separation point lies between the pulley and a deflection sheave.

2. Monitoring installation according to claim 1, wherein the monitoring means is optical.

3. Monitoring installation according to claim 1, wherein said path comprises a rail line, the trolley being a rail-bound trolley with at least one driving wheel.

4. Monitoring installation according to claim 3, wherein the trolley comprises a driving motor supplied by a reloadable battery.

5. Monitoring installation to according to claim 1, wherein both sections consists of a single piece of rope to which a bogey is attached at the separation point.

6. Monitoring installation according to claim 5, comprising two essentially parallel running ropes the second extremity of each being anchored at the second end of the track.

7. Monitoring installation according to claim 5, wherein two extremities of a traction rope are anchored at the first end of the track, which traction rope is deflected in its middle by an idler situated at the second end of the track, so that both halves of the traction rope are essentially symmetric relative to the vertical symmetry plane of the beam.

8. Monitoring installation according to claim 1, wherein the sections are two separate pieces of rope, each of which is attached at one end to a bogey.

9. Monitoring installation according to claim 8, comprising two essentially parallel running ropes the second extremity of each being anchored at the second end of the track.

10. Monitoring installation according to claim 8, wherein two extremities of a traction rope are anchored at the first end of the track, which traction rope is deflected in its middle by an idler situated at the second end of the track, so that both halves of the traction rope are essentially symmetric relative to the vertical symmetry plane of the beam.

11. Monitoring installation according to claim 1, wherein at least one deflection sheave of each traction rope is driven in order to move the rope that runs over it.

12. Monitoring installation according to claim 1, wherein the pulley and the further pulley of the purchase device are coaxial and separated by a friction bearing.

13. Monitoring installation according to claim 1, comprising at least one electrical conductor for the transmission of signals runs from the first end of the track, over a pulley of the purchase device and thence to the monitoring unit.

* * * * *